July 1, 1930.  J. N. HELTZEL  1,768,838
COLLAPSIBLE FORM
Filed July 11, 1924  6 Sheets-Sheet 1

July 1, 1930. J. N. HELTZEL 1,768,838
COLLAPSIBLE FORM
Filed July 11, 1924  6 Sheets-Sheet 2

Inventor:
J. N. HELTZEL,
By Monroe E. Miller
Attorney.

July 1, 1930.  J. N. HELTZEL  1,768,838
COLLAPSIBLE FORM
Filed July 11, 1924   6 Sheets-Sheet 6

Inventor:
J. N. HELTZEL,
By Monroe C. Miller
Attorney.

Patented July 1, 1930

1,768,838

UNITED STATES PATENT OFFICE

JOHN N. HELTZEL, OF WARREN, OHIO

COLLAPSIBLE FORM

Application filed July 11, 1924. Serial No. 725,503.

The present invention relates to forms used in the building of concrete and similar roads and other surfacing constructions, and the primary object of the invention is the provision of means for producing a channel or void in the road when built, usually at the center line thereof, to be subsequently filled, so as to produce a flexible construction joint in the road, which may also serve as a traffic line or marker.

Another object is the provision of means for placing a division plate or strip in the road, for dividing the road into sections or slabs having a flexible construction joint between them, and such means including provision for the convenient formation of a channel or groove in the road above the division plate or strip, to be filled for sealing the joint and producing a traffic line.

A further object is to provide novel collapsible forms for producing the channel or groove in the road in a convenient and facile manner. A still further object is the provision of novel means for supporting the collapsible forms, division plates or strips and reinforcing rods.

The invention also resides in the novel construction of the several devices therein, and in the novel construction and assemblage of the component parts, to enhance the utility and efficiency of the structure.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Referring to Figs. 1 to 6, inclusive, there is shown a sheet metal division plate or strip 30 which is similar to division plates used heretofore in road constructions, for dividing or separating the road into opposite side sections or slabs, excepting that the plate or strip 30, for the present purposes, is of less height than the division plates heretofore used, thereby obtaining a saving in material and cost. The division plate or strip 30 is formed with an offset 31 to form a groove in one section or slab of the road and a complementing tongue on the other section or slab, so that when the road breaks on the line of the division plate, the same will have a tongue and groove joint, thereby locking the sections or slabs against relative vertical displacement. The strip or plate 30, as shown, has its lower edge spaced above the sub-base, although it can be made to extend down to the sub-base, and the upper edge of the plate or strip is spaced several inches below the surface of the road whereas the ordinary division plate now in use extends close adjacent to the surface of the road. The division plate or strip 30 is composed of sections disposed end to end.

Figures 1, 6:
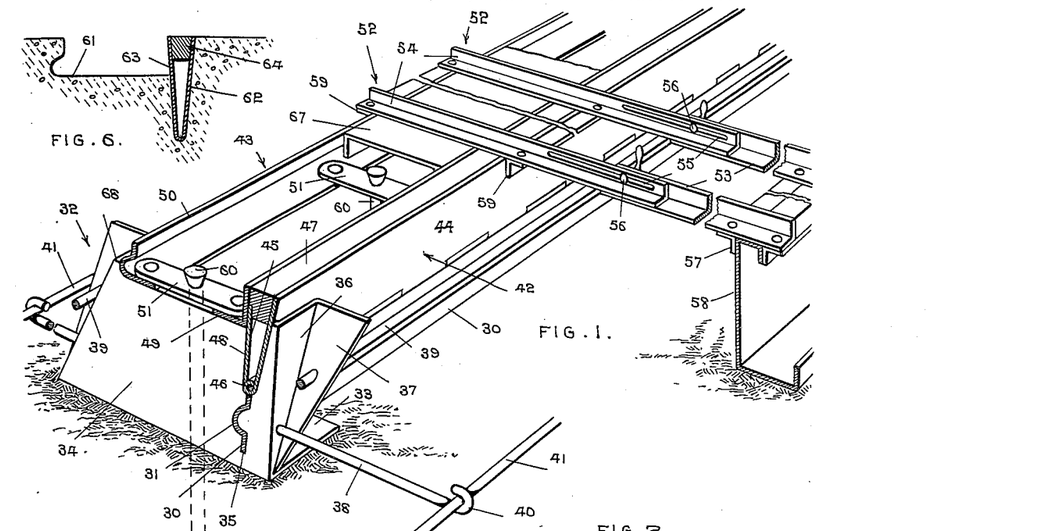
Figure 1 is a fragmentary perspective view of one construction set up ready for the pouring of the concrete.
Fig. 6 is a cross section of the road at the channel, showing a form used supplementary to the main forms, for the formation of a separate traffic line and expansion or sealing joint.
Figure 2:
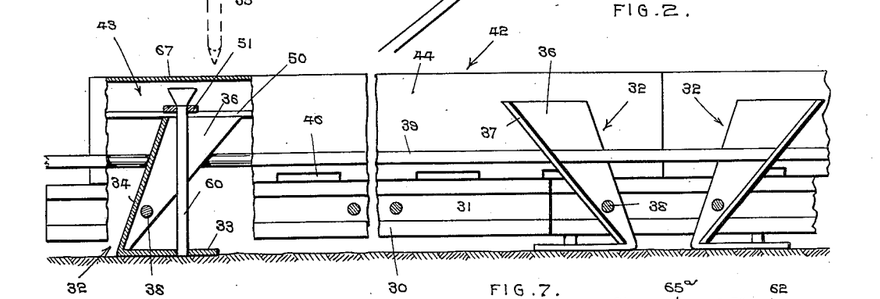
Fig. 2 is a fragmentary side elevation thereof, portions being broken away and shown in section.
Figures 3, 4, 11:
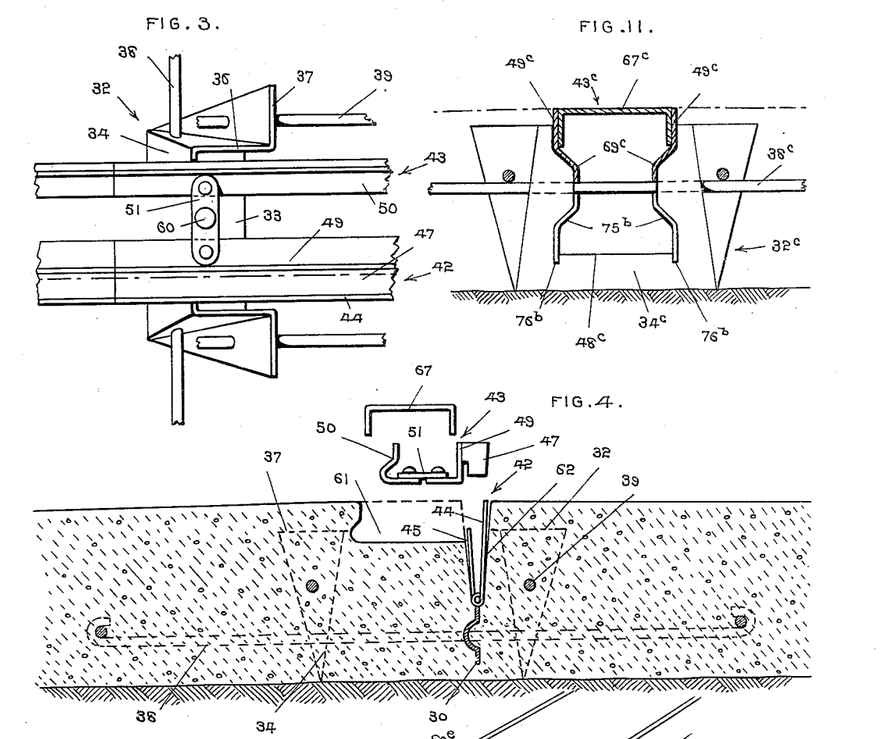
Fig. 3 is a plan view showing one pedestal and adjacent portions of the structure.
Fig. 4 is a cross section of the road showing the channel or void therein, and giving end views of parts of the forms as when being removed.
Fig. 11 is an end view of a fourth modified construction.

In order to support the division plate 30 and other parts of the structure, there are provided pedestals 32 which are formed from sheet metal as shown. Each pedestal comprises a base 33 to rest on the sub-base of the road, and an upwardly extending portion 34 which, as seen in Figs. 1, 2 and 3, is inclined to overhang the base 33. The portion 34 has a slot 35 of a shape to receive and accommodate the division plate 30, whereby the pedestals support the division plate above the sub-base. The portion 34 of each pedestal has angularly extending flanges 36 above the base 33, and said flanges have outstanding wings 37, said flanges and wings tapering downwardly to the lower corners of the portion 34, thereby allowing for the flexing action of the portion 34 relatively to the base 33. By having the portion 33 inclined, the pressure on the portion 34, especially during the tamping of the concrete, during which the tamper may operate over the form structure, will be directed downwardly to the base 33, without a tendency for tilting or upsetting the pedestal, and the inclination of the portion 34 will also enable said portion to spring downwardly slightly under the tamping pressure and impacts. This slight resiliency of the pedestals will enable the structure to give slightly during the tamping operation, while finishing the road, and the pedestals are also prevented from tilting or upsetting inasmuch as the pressure on the portions 34 is in a direction toward the bases of the corresponding pedestals. The pedestals can be reversed, as seen in Fig. 2, so that they will brace one another to prevent the pressure on the structure from displacing same longitudinally.

The flanges 36 and wings 37 are used for supporting reinforcing rods or bars constituting part of the mat which reinforces the concrete. Thus, transverse dowel or tie rods 38 extend through the flanges 36 and longitudinal reinforcing rods 39 extend through the wings 37, said flanges and wings having suitable openings or apertures to receive said rods. As shown, the ends of the rods 38 are bent into hooks 40 to engage other longitudinal reinforcing rods 41 to prevent the rods 38 from pulling loose from the sections or slabs in which they are embedded. Various kinds and forms of reinforcing bars can be used, as will be apparent.

Collapsible forms 42 and 43 are used for producing a channel or void in the upper surface of the road above the division plate 30, and said forms are companions to one another so as to cooperate for the production of a channel of the shape shown in Fig. 4.

The form 42 comprises the side plates 44 and 45 having their lower edges hinged together, as at 46, so that said plates can be swung together and apart. A bar 47 fits in between the upper edges of the side plates 45 to spread said plates apart and to close the space between them for preventing concrete or other matter from falling down between said plates. The portion 34 of each pedestal has a V-slot 48 above the slot 35 to receive the form 42, and, as shown, the hinge 46 comes directly over the upper edge of the division plate 30. The form 42 is thus seated in the slots 48 of the pedestals.

The form 43 comprises the angle iron side members 49 and 50, which are of less height than the side plates 44 and 45 of the form 42, and links 51 are pivoted on the lower flanges of the side members which flanges extend toward one another. The links 51 connect the side members for folding or collapsing movement, inasmuch as the side members when moved longitudinally relatively to one another, will be brought together, thereby reducing the width of the form so that it can be readily removed from the channel in the concrete. A top or cover plate 67 is adapted to be inserted between the side members 49 and 50, for spacing them apart, and for closing the space between said members to prevent concrete and other matter from dropping down between the angle irons or side members 49 and 50. As shown, the plate 57 has depending flanges at its edges to support same with the plate flush with the upper edges of the upstanding flanges of the side members 49 and 50.

The plates 44 and 45, bar 47, angle iron side members 49 and 50, and top plate 67, are composed of sections of suitable length disposed end to end, so that the form can be extended for any distance desired, and the sections are readily assembled and are used repeatedly.

As shown, stakes 60 pass down through holes or apertures in the links 51 between the side members 49 and 50, to enter the ground, for anchoring the structure on the sub-base and to assist in retaining the structure in proper position.

The angle iron side members 49 and 50 are seated on the upper edges of the pedestals, and the side member 49 bears against the side plate 45 of the form 42, while the side member 50 bears against a lug or stop 68 with which the portion 34 of the pedestal is provided, to prevent lateral displacement of the form 43 on the pedestal. The upper edge of the pedestal is thus recessed to receive the forms and support same against transverse displacement. The bar 47 of the form 42, in this case, is riveted or otherwise secured to the upstanding flange of the side member 49, to facilitate the assembly of the two forms.

In order to position the forms at the desired longitudinal line over the sub-base, an adjustable gage or templet is provided comprising the longitudinally adjustable bars 52 of angle iron or other suitable material. Said bars are composed of the sections 53 and 54 overlapping one another, said sections 54 having longitudinal slots 55 receiving clamping bolts 56 carried by the sections 53, whereby the bars can be adjusted in length. Angle irons or members 57 are secured to the sections 53 to engage opposite sides of the tread of one of the side rails 58 used for defining the side edges of the road, and angle irons 59 or similar members are secured to the sections 54 to be disposed at the opposite sides of the forms 42 and 43. The bars 52 can be spaced apart longitudinally of the structure any desired distance, and the angle irons or members 57 and 59 extend longitudinally from one bar 52 to the other. The bars 52 can also be used as braces to assist in holding the forms in place while the concrete is being poured, and the templet or gage is removed when tamping and finishing the road.

The structure is readily set up or assembled on the sub-base, or may be assembled at one side of the road and then positioned on the sub-base, and the stakes 60 are driven down to secure the structure on the sub-base. One or more of the templets or gages can be used to assist in positioning and bracing the forms prior to and during the pouring of the concrete. The bar 47 and top plate 67 will close the two forms, to prevent concrete from passing down between the side members of the forms, but the concrete can flow under the forms. In assembling the parts, the division plate 30 is slid lengthwise through the slots 35 of the pedestals, and the reinforcing rods are then inserted through the pedestals, the tie bars or rods 38 also passing through the division plate 30. The forms 42 and 43 are then readily positioned on the pedestals.

After the concrete has set or hardened, the same having been tamped and finished off as usual, the forms 42 and 43 can then be removed so as to be used repeatedly, the sections thereof being removed from the hardened concrete and transferred to continue on with the structure as the road progresses. When the top plate 67 of the form 43 is lifted out from between the side members 49 and 50, the stakes 60 are readily withdrawn, and the side member 50 can then be moved longitudinally so as to move toward the side member 49. This contracts the form 43 transversely, so that it can be readily lifted out of the channel, the bar 47 being removed from the plates 44 and 45 at the same time, as seen in Fig. 4. The plates 44 and 45 can then be swung together, so as to collapse the form 42, and permit said plates 44 and 45 to be readily lifted out of the channel.

The channel or void in the road has the broad shallow portion 61, and the deep narrow portion 62, with the portion 62 extending down to the division plate 30. The division plate and pedestals remain embedded in the concrete. The angle iron side member 50, as shown, has a protruding bend at its elbow, so that the side wall of the channel opposite to the portion 62 is formed with an overhanging ledge.

The channel thus formed is used for producing a traffic line on the road and a seal or closure for the joint. Thus, as shown in Fig. 6, a supplementary form 63 is used, similar to the form 42, excepting that the side plates are integrally united at their lower edges instead of being hinged, and the side plates of said supplementary form 63 spring toward one another when the bar 64 is removed. The form 63 is fitted down in the portion 62 of the channel. The portion 61 of the channel is now filled with concrete or other suitable plastic material, which may be of pure white color, or any other color, and which may have other characteristics as disclosed in my copending application Serial No. 708,558, filed April 23, 1924. After the concrete in the portion 61 of the channel has hardened, the bar 64 is removed, so that the side plates of the form 63 spring together, and the form 63 is then removed, leaving a narrow and deep groove above the division plate 30 and along one edge of the traffic line 65. The deep groove is filled with asphalt, tar or other similar semi-solid or yieldable material, thereby forming a seal 66 for the joint between the sections or slabs of the road. The seal will also form a line along the traffic line or marker 65, to add to the distinctiveness thereof. The concrete will break or divide along the line of the division plate 30, and the seal 66 will close the joint at the top, thereby preventing water and other foreign matter from passing down through the joint or fracture between the sections or slabs.

It will be noted that the pedestals 32 not only support the division plate 30, but also support the reinforcing rods prior to and during the pouring of the concrete, so that the reinforcing rods and division plate are held in fixed positions above the sub-base. Said pedestals also serve as supports for the forms until the forms are removed. The pedestals being seated on the sub-base will also prevent the division plate and reinforcing rods from being driven down below their proper elevations during the tamping of the concrete, and after the concrete has hardened the pedestals having the flanges 36 and wings 37 embedded in the opposite sections or slabs of concrete will assist in tying or bonding them together.

Figure 7:
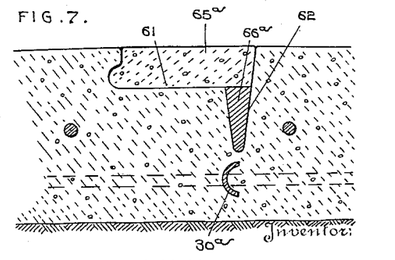
Fig. 7 is a view similar to Fig. 5 illustrating a modification.

Fig. 7 shows a variation, in which the seal is concealed below the traffic line. Thus, the seal 66$^a$ is in the portion 62 flush with the bottom of the portion 61, and the traffic line 65$^a$ extends the full width of the channel over the seal 66$^a$. There is also shown a modification in the division plate or strip 30$^a$, same being of arcuate section, without the flat upper and lower edge portions, and with its upper and lower edges spaced from the sub-base and seal 66$^a$. The concrete will break or crack between the portion 62 of the channel and the strip 30$^a$, and between the lower edge of said strip and the sub-base, to provide the construction joint having the interlocking tongue and groove.

Figures 8, 9, 10, 12:
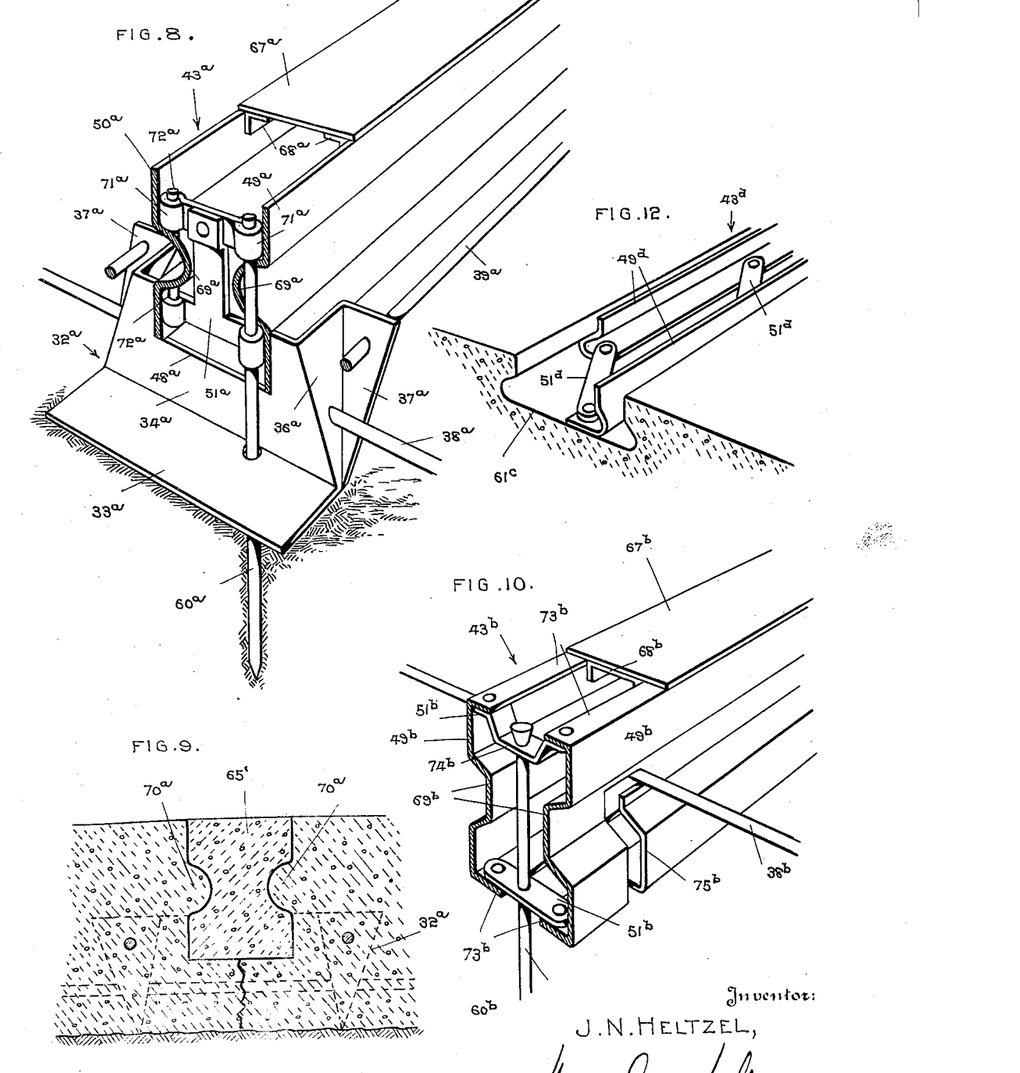
Fig. 8 is a fragmentary perspective view showing a second construction with modifications.
Fig. 9 is a cross section of a completed road as made by the form shown in Fig. 8.
Fig. 10 is a perspective view of a third form construction.
Fig. 12 is a fragmentary perspective view of a fifth modified form construction.

The modified construction shown in Fig. 8 does not use the division plate or the V-shaped form, such as the form 42 hereinbefore described, but includes a modified form for the production of a construction joint and traffic line. Thus, the form 43$^a$ comprises the side plates 49$^a$ and 50$^a$ on which is seated the top or cover plate 67$^a$ having the depending flanges or angle irons 68$^a$ to overlap the inner surfaces of said side plates, for holding the plate 67$^a$ on the upper edges of said side plates. The pedestal 32$^a$ is also of different form than the pedestal 32 hereinbefore described, the base 38$^a$ being at that side of the upwardly projecting portion 34$^a$ opposite to the flanges 36$^a$ and wings 37$^a$. The reinforcing rods 38$^a$ and 39$^a$ pass through said flanges and wings, respectively, and the portion 34$^a$ has a recess 48$^a$ to receive the lower edge portions of the side plates 49$^a$ and 50$^a$, so that the form is supported by the pedestals as well as the reinforcing rods. The side plates are connected by links 51$^a$ whereby the side plates, when moved longitudinally relatively to one another, will be moved toward one another, the same as with the side members of the form 43 shown in Fig. 1. The side plates 49$^a$ and 50$^a$ have the inwardly offset portions 69$^a$ which form ribs 70$^a$ on the sections or slabs of concrete, as seen in Fig. 9. The links 51$^a$ have eyes 71$^a$ above and below the offsets 69$^a$, and the links 51$^a$ are permanently hinged to the side plate 50$^a$ and are detachably connected by a hinge joint to the side plate 49$^a$. Thus, the offset 69$^a$ of the side plate 50$^a$ has upwardly and downwardly extending pintles 72$^a$ on which the corresponding eyes 71$^a$ are fitted for turning movement, and a stake 60$^a$ passes down through the opposite eyes 71$^a$ and through apertures in the offset 69$^a$ of the side plate 49$^a$. Said stake also passes through an aperture in the base 33$^a$ of the pedestal. The stake 60$^a$ passes down into the ground or sub-base for anchoring the form in place, and the stake also serves to hingedly connect the side plate 49$^a$ and link 51$^a$.

The form is used in substantially the same manner as the form 43 hereinbefore described, the concrete being poured at the opposite sides of the form, after the form is properly set up. The form is spaced above the sub-base so that the concrete can flow under the form. After the concrete has set, the top or cover plate 67$^a$ is removed, and the stakes 60$^a$ withdrawn. The links 51$^a$ can then be swung toward the side plate 50$^a$, so that the side plates can be moved toward one another and lifted out of the channel. The channel is then filled with concrete or other plastic material to provide the traffic line and joint member 65′, as seen in Fig. 9, having grooves interlocked with the ribs or tongues 70$^a$. The road will fracture or crack under the member 65′, to divide it into two opposite side sections or slabs connected by the flexible construction joint.

Fig. 10 illustrates another collapsible form 43$^b$ composed of the side plates 49$^b$ having the offsets 69$^b$ between their upper and lower edges. A top or cover plate 67$^b$ seats on the side plates, and a channel member 68$^b$ is secured to the lower surface of the plate 67$^b$ to fit between the upper edges of the side plates. The side plates have inturned flanges 73$^b$ at their upper and lower edges, which stiffen the side plates, and the upper flanges also provide seats for the top plate 67$^b$. Links 51$^b$ are pivoted to the flanges 73$^b$ to connect the side plates so that they are moved toward one another when moved longitudinally relatively to one another. The links are arranged in superposed pairs, so that a stake 60$^b$ can be driven down through apertures in the links of each pair, said links being located within the form, and the upper links have the dropped offsets 74$^b$ permitting the heads or upper ends of the stakes to be disposed below the plane of the upper flanges 73$^b$ and top plate 67$^b$. In this form, the side plates have bayonet slots 75$^b$ extending upwardly from their lower edges through the lower flanges 73$^b$ and terminating in the offsets 69$^b$, to accommodate the cross tie rods 38$^b$, and said slots support the tie rods until the concrete has set. Then, the slots permit the side plates 49$^b$ to be moved longitudinally relatively to one another, so that the side plates are moved toward one another, and they can then be lifted out of the channel in the road, the stakes being pulled from the ground with the side plates or being extracted previously.

Fig. 11 shows a form 43$^c$ composed of the side plates 49$^c$ disposed within a recess or opening 48$^c$ of the upwardly projecting portion 34$^c$ of the pedestal 32$^c$, said plates bearing against the opposite edges of the recess 48$^c$, and a top or cover plate 67$^c$ being fitted between the upper edges of the side plates 49$^c$. The side plates have the offsets 69$^c$ and the upper edges of the side plates are held apart by the top plate 67$^c$, while the lower edges of the side plates engage in notches 76$^c$ in the pedestal at the lower corners of the recess 48$^c$ to hold the lower edges of the side plates spaced apart. The side plates have slots 75$^c$ extending upwardly from their lower edges for accommodating the tie rods 38$^c$ and permitting the side plates to be lifted out of the channel in the road.

Fig. 12 shows a collapsible form 43$^d$ composed of the angle iron side members 49$^d$ having the links 51$^d$ riveted on their lower flanges, whereby the form can be contracted transversely for removal from the channel 61$^c$ formed in the road, the members 49$^d$ being of the shape of the member 50 shown in Fig. 1, so that the sides of the channel have overhanging ledges whereby the traffic line member formed in the channel will be keyed to the road. This form is intended especially for the production of a traffic line in the surface of the road.

Figure 13:
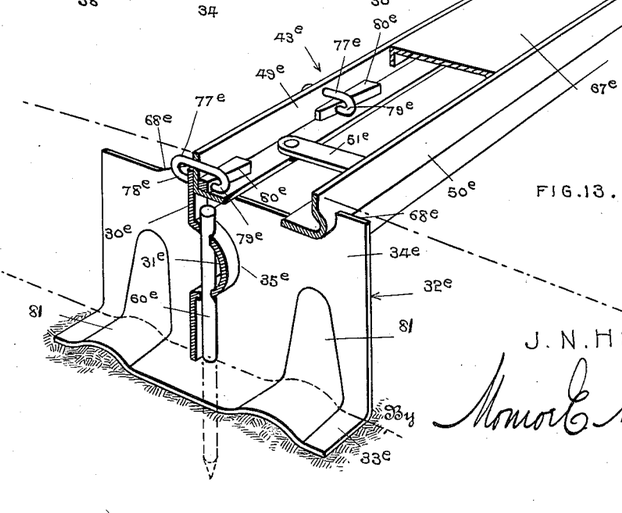
Fig. 13 is a fragmentary perspective view of a sixth modified form construction.

Fig. 13 illustrates a somewhat similar form 43$^e$ composed of the angle iron side members 49$^e$ and 50$^e$ connected by the links 51$^e$ pivoted on the lower flanges of said members, and a top plate 67$^e$ is disposed between said members. In this illustration there is shown an ordinary division plate 30$^e$ as heretofore used for dividing the road into opposite side sections or slabs, said division plate having the offset 31$^e$ to form the tongue and groove in the sections or slabs, and stakes 60$^e$ are driven down through apertures in the offset and into the sub-base for supporting the division plate in place, and its upper edge is spaced slightly below the surface of the road. Means are provided for attaching the form 43$^e$ to the division plate so as to support the form from the upper edge of said division plate, and a traffic line can thus be produced in the road at the upper edge of the joint. Thus, rods 77$^e$ are inserted through apertures provided in the upstanding flange of the side member 49$^e$ and have hooks 78$^e$ and 79$^e$ at their outer and inner ends, respectively. The hooks 78$^e$ are turned down so as to bear against one side of the division plate 30$^e$, while the side member 49$^e$ bears against the opposite side of the division plate, with the rods 77$^e$ extending across the upper edge of the division plate. Wedges 80$^e$ are then driven between the upstanding flange of the member 49$^e$ and the hooks 79$^e$, thereby clamping the member 49$^e$ tightly against the division plate, so that the form 43$^e$ is supported from said plate. After the concrete has been poured and while it is still soft, the top plate 67$^e$ is removed and the wedges 80$^e$ also removed. The rods 77$^e$ can then be manipulated so as to withdraw them from the member 49$^e$. Said rods are first turned to move the hooks 79$^e$ above the division plate, and the rods are then turned and slid so as to withdraw the hooks 78$^e$ from the member 49$^e$. This can be done before the concrete has hardened, and any disturbance of the concrete along the member 49$^e$ can be readily rectified. The side members 49$^e$ and 50$^e$ of the form can be left in place until the concrete hardens, in which event said side members can be moved toward one another so as to lift them from the channel in the road, and said channel is then filled with concrete or other suitable material to produce a traffic line.

Fig. 13 also depicts a sheet metal pedestal 32$^e$ composed of the base 33$^e$ and upright portion 34$^e$, said portion having the slot 35$^e$ to receive the division plate which extends over and seats upon the base 33$^e$. The portion 34$^e$ has the upstanding lugs 68$^e$ at the opposite sides of the form providing a recess between them to receive the form, and to prevent the form from being displaced laterally. The stake 60$^e$ passes down through the base of the pedestal. In order to stiffen and strengthen the pedestal, the base 33$^e$ has upstruck corrugations 80 which extend across the bend between the base and upright portion and up into said portion, said corrugations being located at opposite sides of the division plate. By using the corrugations lighter or thinner sheet metal can be used for the pedestals.

Figures 14, 15, 16, 17:
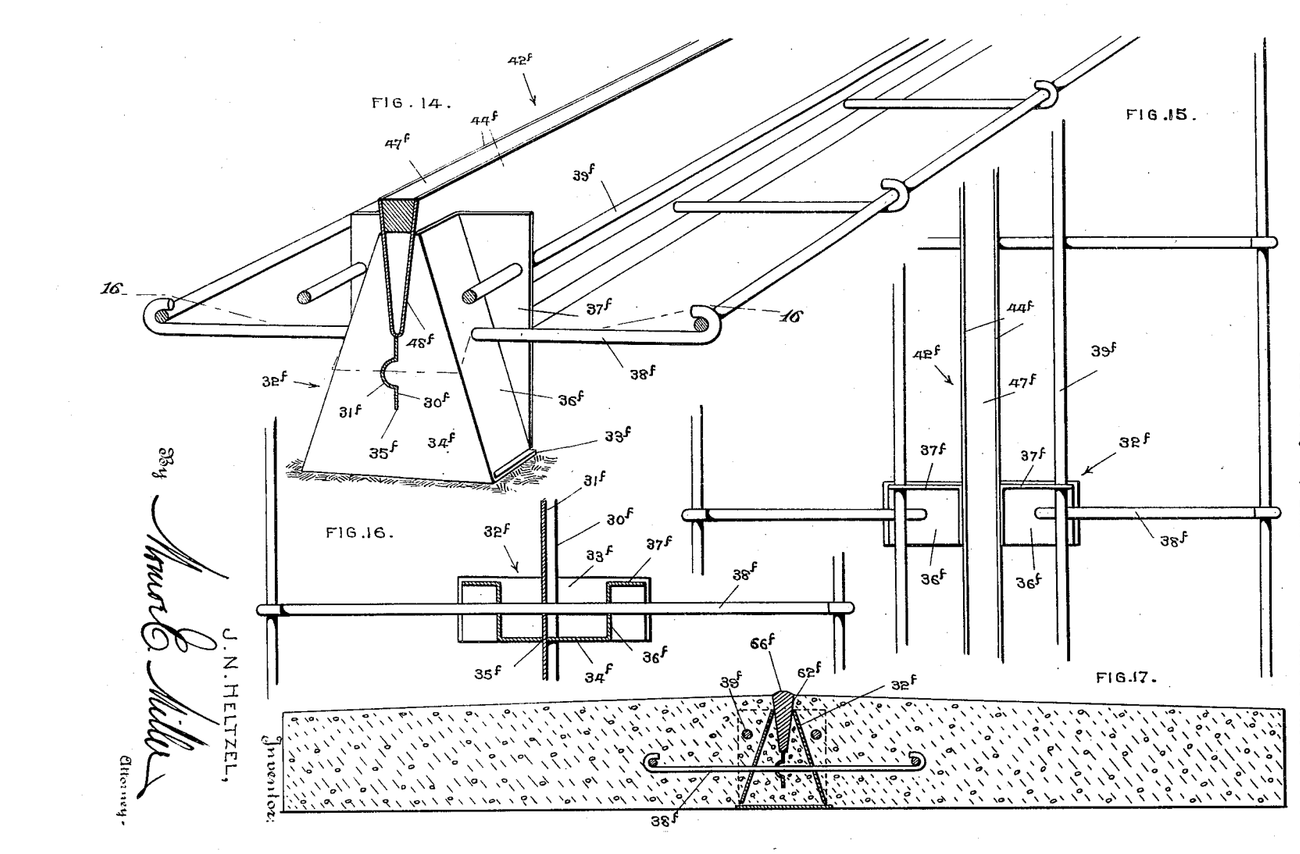
Fig. 14 is a fragmentary perspective view of another modified construction.
Fig. 15 is a fragmentary plan view of the structure shown in Fig. 14.
Fig. 16 is a horizontal section on the line 16—16 of Fig. 14.
Fig. 17 is a cross section of a road built by the use of the construction of the Figs. 14, 15 and 16.

Figs. 14, 15 and 16 show the use of a V-shaped form 43$^f$ above the division plate 30$^f$, said division plate having the offset 31$^f$, and the form being composed of the upwardly diverging side plates 44$^f$ integrally united at their lower edges. A bar 47$^f$ is disposed between the upper edges of the side plates for spacing them apart and for closing the space between the side plates. The pedestal 32$^f$ has the base 33$^f$ and upstanding portion 34$^f$ provided with the flanges 33$^f$ and wings 37$^f$, the reinforcing rods 38$^f$ and 39$^f$ passing through said flanges and wings, respectively. The portion 34$^f$ has a slot 35$^f$ to receive the division plate, and has the V-shaped slot 48$^f$ above the slot 35$^f$ to receive the form 42$^f$.

The pedestals support the division plate, reinforcing rods and collapsible form, during the pouring and setting of the concrete. After the concrete has hardened, the bar 47$^f$ is removed, and the side plates of the form 42$^f$ spring toward one another so that they can be readily lifted from the groove 62$^f$ formed in the road above the division plate. The groove is filled with asphalt, tar or similar material to provide a seal 66$^f$ closing the joint. The seal also provides a traffic line, and the division plate can be of less height than the usual division plate as shown in Fig. 13, to effect a saving in material and cost.

The form 43$^g$ shown in Figs. 18, 19, 20, 21 and 22, comprises the upwardly diverging side plates 44$^g$ hingedly connected at their lower edges, as at 46$^g$, and provided between their upper and lower edges with the offsets 69$^g$, a top or cap plate 42$^g$ bearing on the upper edges of the side plates and having depending flanges 68$^g$ overlapping the side plates. The top plate also has, at spaced longitudinal points, the depending spacers 68' to be disposed between the side plates for holding them spaced apart. The pedestal 32$^g$ has the base 33$^g$ and upwardly extending portion 34$^g$ provided with the recess or slot 48$^g$ to receive the form 43$^g$, and said portion 34$^g$ has the flanges 36$^g$ and wings 37$^g$ to support the reinforcing rods. In this construction, the transverse reinforcing rods 38$^g$ extend through the form, and the form has slots 75$^g$ in the plates 44$^g$ extending upwardly through the hinge and into the offsets 69$^g$, whereby the plates 44$^g$ can be lifted out of the groove or channel in the road away from the rods 38$^g$.

Figures 18, 19, 20, 21, 22, 23, 24:
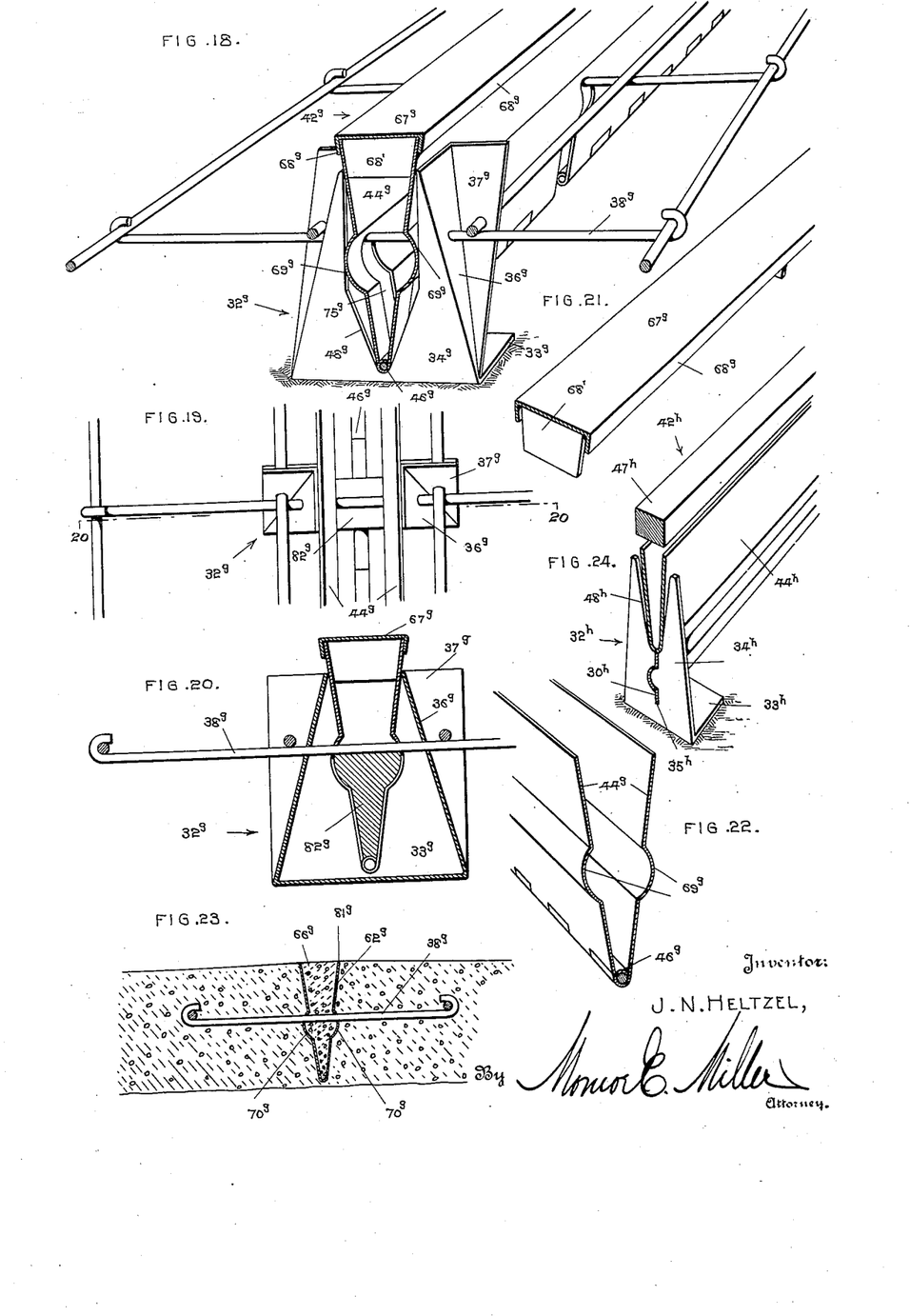
Fig. 18 is a fragmentary perspective view of still another modified construction.
Fig. 19 is a plan view of the pedestal shown in Fig. 18 and adjacent portions of the structure, with the top or cap plate removed.
Fig. 20 is a cross section on the line 20—20 of Fig. 19.
Fig. 21 is a fragmentary perspective view of the top or cap plate used in the structure shown in Figs. 18, 19 and 20.
Fig. 22 is a fragmentary perspective view of the collapsible form shown in Figs. 18, 19 and 20.
Fig. 23 is a cross section of a road built by use of the structure shown in Figs. 18-22.
Figs. 24 and 25 are fragmentary perspective views of other modified constructions.

Fig. 23 shows a joint made by the forms shown in Figs. 18–22. The groove or channel 62$^g$ formed in the road is of V-shape, and the joint member 66$^g$ may be of concrete, asphalt, tar, or other suitable material. The offsets 69$^g$ form the interlocking tongues and grooves, as at 70$^g$. As shown, the traffic line and joint member 66$^g$ is spaced slightly above the sub-base. If concrete is used for the member 66$^g$, it is preferable to coat the walls of the channel or groove with tar or similar material, as at 81$^g$, to prevent the member 66$^g$ from adhering to the sections or slabs of concrete at the opposite sides of the channel or groove.

Fig. 24 illustrates a simple construction wherein the form 42$^h$ comprises the V-shaped plate 44$^h$ and the bar 47$^h$ to be disposed between the upper edge of the plate. The pedestal 32$^h$ comprises the base 33$^h$ and upstanding portion 44$^h$ having the slot 35$^h$ for the division plate 30$^h$, said portion having a slot 48$^h$ above the slot 35$^h$ to receive the form 42$^h$. The road construction will be substantially the same as shown in Fig. 17, excepting that the reinforcing rods are omitted, although suitable reinforcing rods can be embedded in the concrete.

Figure 5:
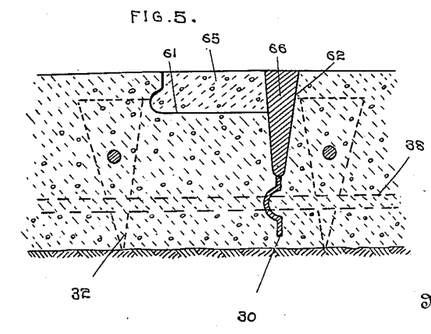
Fig. 5 is a cross section of the completed road with the channel or groove filled.
Figures 25, 26:
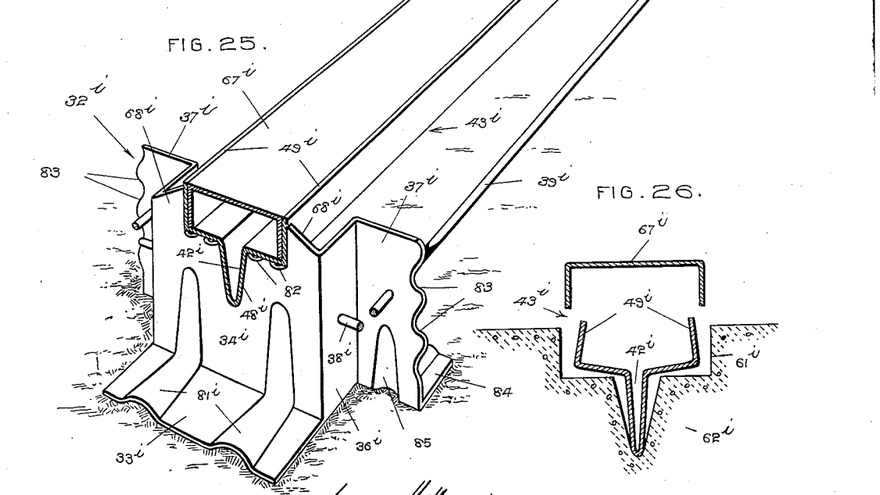
Fig. 26 is a cross section showing the form of Fig. 25 collapsed in the channel produced in the road.

Figs. 25 and 26 illustrate further variations in the form and pedestal. The pedestal has the base 33$^i$ and upright portion 34$^i$, said upright portion having flanges 36$^i$ from which the wings 37$^i$ extend. The reinforcing rods 38$^i$ and 39$^i$ extend through the flanges 36$^i$ and wings 37$^i$, respectively, to be supported by a pedestal above the sub-base. The form 43$^i$ is of T-shape, and comprises the angle side portions 49$^i$ connected by a V-shaped portion 42$^i$, and a top or cover plate 67$^i$ is adapted to be positioned between the angle portions 49$^i$, said top plate being of channel shape with its flanges depending to overlap the inner sides of the angle portions 49$^i$. The portion 42$^i$ tends to spring to laterally contracted position, as seen in Fig. 26, so as to contract the lower or body portion of the form when the top plate 67$^i$ is removed, said top plate, when inserted, holding the form expanded, as seen in Fig. 5. The form is seated on the upper edge of the pedestal within the recess defined between the upstanding lugs 68$^i$ with which the portion 34$^i$ of the pedestal is provided, and said portion of the pedestal has a V-shaped recess or slot 48$^i$ to receive the portion 42$^i$ of the form. The upper edge of the pedestal is also corrugated, as at 82 where the form seats on the pedestal, thereby strengthening the pedestal. Corrugations 82$^i$ are pressed in the base 33$^i$ of the pedestal and extend upwardly into the portion 34$^i$, to stiffen and brace the pedestal. The wings 37$^i$ have base portions 84 projecting therefrom in a direction opposite to the direction in which the base 33$^i$ projects, and the portions 84 can rest on the sub-base with the base 33$^i$. The portions 84 and wings 37$^i$ have corrugations 85 pressed therein similar to the corrugations 81$^i$. The outer edges of the wings 37$^i$ are also corrugated, as at 83, in order to assist in anchoring the opposite portions of the pedestal in the sections or slabs of concrete, so that the pedestal will tie or bond the sections or slabs together. If the pedestals are made of sufficiently heavy sheet metal then the tie rods 38$^i$ may be dispensed with.

Figs. 26 shows a channel 61$^i$ formed in the surface of the concrete by the form, with the top plate 67$^i$ removed, so that the lower or body portion of the form will be contracted transversely for ready removal from the channel without chipping or loosening the concrete from the edges of the channel. The portion 42$^i$ of the form defines a V-shaped groove 61$^i$ below the bottom of the channel 61ʲ proper between the side walls of the channel. The groove 62ʲ can receive the sealing material, such as asphalt or tar, while the channel portion 61ʲ can receive the concrete or other material to form the traffic line.

Figures 27, 28:
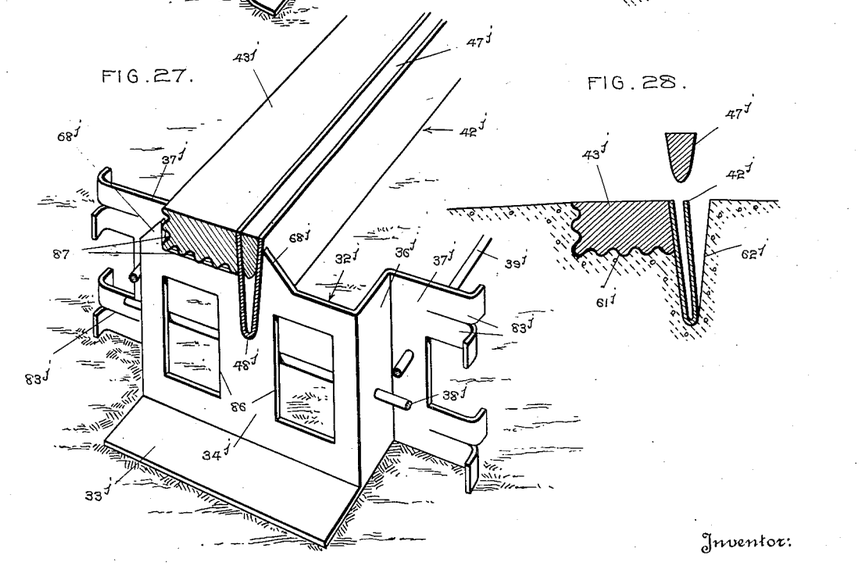
Fig. 27 is a fragmentary perspective view of still another modified construction.
Fig. 28 is a cross section showing the form of Fig. 27 collapsed in the channel produced in the road.

Figs. 27 and 28 illustrate a form 43ʲ having the bottom and one side corrugated, as at 87, and the V-shaped division form 42ʲ bears against the opposite side of the form 43ʲ. The sides of the form 42ʲ are held apart by a closure and spreading bar 47ʲ inserted between the upper edges of the sides of the form 42ʲ.

The pedestal 32ʲ comprises the base 33ʲ, upright portion 34ʲ, flanges 36ʲ and wings 37ʲ. The forms are seated on the portion 34ʲ which has a recess 48ʲ to receive the form 42ʲ, and said portion has the upstanding lugs 68ʲ to prevent transverse displacement of the forms on the pedestal. The portion 34ʲ of the pedestal has openings 86 to permit the concrete to flow through the pedestal from one side to the other. The wings 37ʲ have the hooks or anchor portions 83ʲ projecting therefrom to be embedded in the concrete for tying or bonding the two sections or slabs of concrete together. The reinforcing rods 38ʲ and 39ʲ extend through the flanges 36ʲ and wings 37ʲ.

The channel formed in the surface of the concrete is similar to that shown in Figs. 5 and 6, excepting that the bottom and side wall of the portion 61ʲ of the channel are corrugated, as seen in Fig. 28, so as to more securely unite the traffic line with the road structure. The form 42ʲ provides the groove 62ʲ for receiving the sealing material, and when the concrete has set, and the bar 47ʲ is removed, the form 42ʲ, by its resiliency, contracts itself transversely, so that the forms 42ʲ and 43ʲ can be removed from the channel.

Having thus described the invention, what is claimed as new is:—

1. A form construction of the character described comprising associated traffic line and division forms to produce a channel in the surface of a concrete road or similar surfacing structure, the division form projecting downwardly below the traffic line form to provide the channel with a groove to receive sealing material below the bottom of the traffic line.

2. A form construction of the character described comprising associated traffic line and division forms to produce a channel in the surface of a concrete road or similar surfacing structure, the division form projecting downwardly below the traffic line form to form the channel with a groove to receive sealing material, one of said forms being constructed to be contracted transversely to facilitate the removal of the forms from the channel.

3. A form construction of the character described comprising a supporting pedestal to rest on a sub-base, and companion traffic line and division forms adapted to be supported by the pedestal in associated relation in the desired line and grade.

4. A form construction of the character described comprising supporting means having provision for supporting a division plate, a form to be supported by said means above said division plate, and a companion form at one side of the firstnamed form and associated therewith, said forms producing a channel in a concrete surfacing structure in which they are disposed, the secondnamed form producing a wide shallow portion in the channel for a traffic line and the firstnamed form producing a deep portion for receiving a seal over the division plate.

5. A form construction of the character described comprising pedestals having provision for receiving and supporting a division plate, a form to be supported by the pedestals above said division plate and including side plates movable toward and away from one another, and a companion form to be supported by the pedestals and including side members and means connecting them for the movement of said side members toward and away from one another, said forms being disposed side by side with the corresponding side plate and member disposed together.

6. A form construction of the character described comprising pedestals having provision for receiving and supporting a division plate, a form to be supported by the pedestals having upwardly diverging side plates to be moved toward and away from one another, said form including a bar to be disposed between the upper edges of said side plates, and a companion form including side members, means connecting said side members for the movement thereof toward and away from one another, and a top plate to be disposed between said side members, the second form being adapted to be supported by the pedestals with one side member bearing against the corresponding side plate of the firstnamed form.

7. A collapsible form comprising side plates having their lower edges hingedly connected, and means for supporting said plates on a sub-base to define a groove in a concrete road or similar surfacing structure.

8. A collapsible form comprising side plates having their lower edges connected for the swinging movement of the plates toward and away from one another, and a longitudinal member to be removably disposed between the upper edges of said plates for spacing said plates apart and closing the space between them.

9. A collapsible form comprising side plates having their lower edges hingedly connected, and a longitudinal member to be disposed between the upper edges of said plates for spacing said plates apart and closing the space between them.

10. A construction of the character described comprising supporting means having provision for receiving and supporting a division plate, and a removable form supported by said means above the division plate to produce a channel in a concrete surfacing structure above the division plate.

11. A construction of the character described comprising supporting means having provision for receiving and supporting a division plate, and a form to be supported by said means above said division plate and having side plates to be moved toward one another, said form being adapted to produce a channel in a concrete surfacing structure above the division plate.

12. A structure of the character described comprising pedestals having provision for receiving and supporting a division plate, and a form to be supported by the pedestals above the division plate for producing a channel in a concrete surfacing structure above the division plate.

13. A construction of the character described comprising pedestals having slots for receiving and supporting a division plate, and a form to be disposed above said division plate for producing a channel in a concrete surfacing structure above the division plate, the pedestals having slots above the aforesaid slots for receiving and supporting said form.

14. A construction of the character described comprising a collapsible form having side plates movable toward and away from one another, and pedestals having bases to seat on a sub-base and having recesses spaced above said bases for receiving said form to support it in a position elevated above the sub-base.

15. A pedestal of the character described having means to seat on a sub-base adapted for supporting a form in a position elevated above the sub-base and having means for supporting reinforcing rods above said sub-base.

16. The combination of a pedestal adapted to seat on a sub-base, and a form adapted to be supported by said pedestal for dividing a concrete surfacing structure into opposite sections or slabs, said pedestal having deformed portions to be disposed at opposite sides of said form and to be embedded in said sections or slabs for tying them together.

17. A pedestal of the character described having a portion for supporting a form to divide a concrete surfacing structure into opposite sections or slabs, and said pedestal having portions to be embedded and anchored in said sections or slabs for tying them together and preventing separation thereof.

18. A construction of the character described comprising a pedestal to seat on a sub-base, and a form adapted to be supported by the pedestal to form a channel in a concrete surfacing structure dividing said structure into opposite sections or slabs at the opposite sides of the channel, said pedestal having portions to be embedded and anchored in said sections or slabs at the opposite sides of the channel for tying said sections or slabs together.

19. A pedestal of the character described to seat on a sub-base, and a form for producing a channel in a concrete surfacing structure, the pedestal having a recess for removably receiving said form and to support the form in elevated position and against lateral displacement above the sub-base.

20. A pedestal of the character described comprising a base, a portion extending upwardly from the base and having provision for supporting a form in a position elevated above said base, and portions extending from said portion for supporting reinforcing rods at opposite sides of said form.

21. A pedestal of the character described comprising a base, a portion extending upwardly from the base and having provision for supporting a form, flanges extending from said portion for supporting a transverse rod, and wings extending from said flanges for supporting longitudinal reinforcing rods.

22. A pedestal of the character described comprising a base, and a portion extending upwardly from the base and having provision for supporting a form, said portion being inclined to overhang the base, to provide for the yielding action of said portion.

23. A pedestal of the character described comprising a base and a yieldable upwardly extending supporting portion having provision for supporting a form.

24. A collapsible form comprising side members, and links connecting them for the movement of said members toward and away from one another when moved longitudinally relatively to one another.

25. A collapsible form comprising angle iron side members having flanges extending upwardly and other flanges at the bottom extending toward one another, and links pivoted to the last named flanges.

26. A collapsible form comprising spaced form members, and links connecting them to permit said members to be moved toward and away from one another, said links having stake receiving openings between said members.

27. A collapsible form having upwardly diverging side portions whose upper edges are adapted to be moved toward one another for removing the form from a groove, and a longitudinal member adapted to be removably disposed between said edges for spacing said portions apart and closing the space between them.

28. A joint and reinforcing structure to be embedded in a concrete road, comprising a member adapted to be supported on the sub-base of the road, a joint member supported by the first named member, and a reinforcing rod also supported by the first named member.

29. A joint and reinforcing structure to be embedded in a concrete road, comprising a supporting member adapted to be supported on a road sub-base, a joint member supported by said supporting member, and a reinforcing rod also supported by said supporting member and extending transversely under said joint member.

30. A joint and reinforcing structure to be embedded in a concrete road, comprising a supporting member adapted to be supported on a road sub-base, a joint member supported by said supporting member, and parallel reinforcing rods also supported by said supporting member and located at opposite sides of said joint member.

31. A joint and reinforcing structure to be embedded in a concrete road, comprising a supporting member adapted to be supported on a road sub-base, a joint member supported by said supporting member, reinforcing rods supported by said supporting member longitudinally of and at opposite sides of the joint member, and a reinforcing rod supported by said supporting member transversely of said joint member.

32. A joint and reinforcing structure to be embedded in a concrete road, comprising a supporting member adapted to be supported on a road sub-base and having an upwardly opening slot, a joint member seated in said slot, and reinforcement, said supporting member having means supporting said reinforcement above the sub-base.

In testimony whereof I hereunto affix my signature.

JOHN N. HELTZEL.